Aug. 18, 1964                     E. L. ANDERSON                        3,144,957
                        CLOSURE APPARATUS FOR PRESSURE CHAMBER
Filed Jan. 22, 1962                                              5 Sheets-Sheet 1

INVENTOR.
EDGAR L. ANDERSON
BY
*Thomas & Roessel*
ATTORNEYS

Aug. 18, 1964    E. L. ANDERSON    3,144,957
CLOSURE APPARATUS FOR PRESSURE CHAMBER
Filed Jan. 22, 1962    5 Sheets-Sheet 2
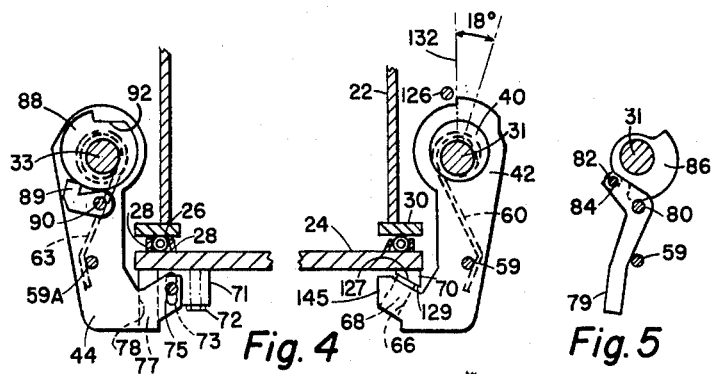
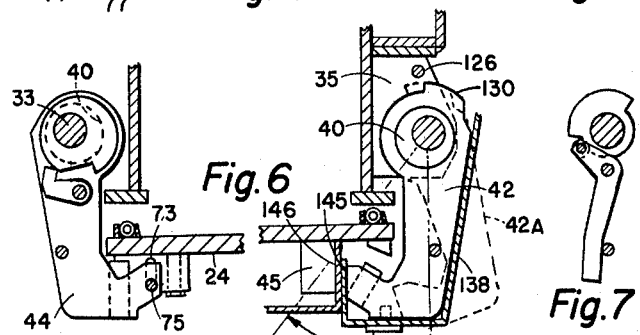
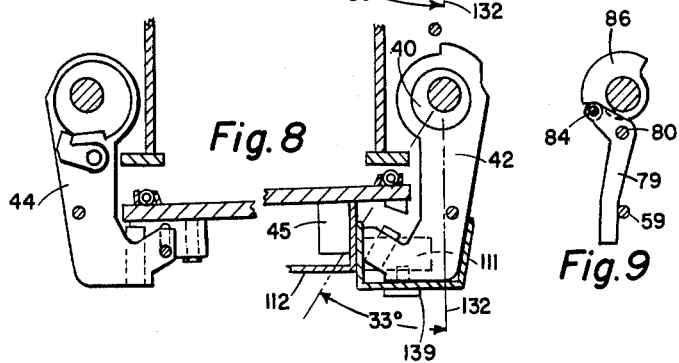
INVENTOR.
EDGAR L. ANDERSON
BY
*Thomsen & Roessel*
ATTORNEYS

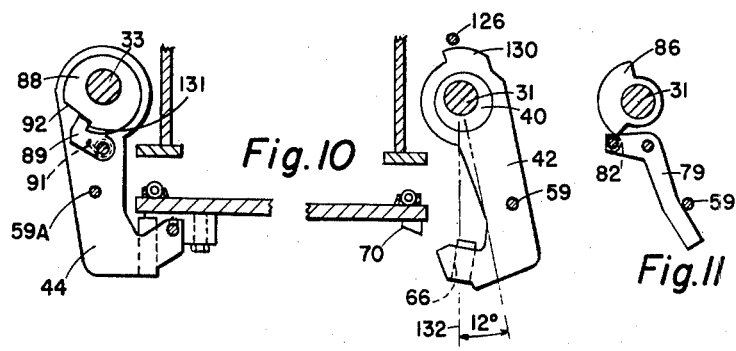
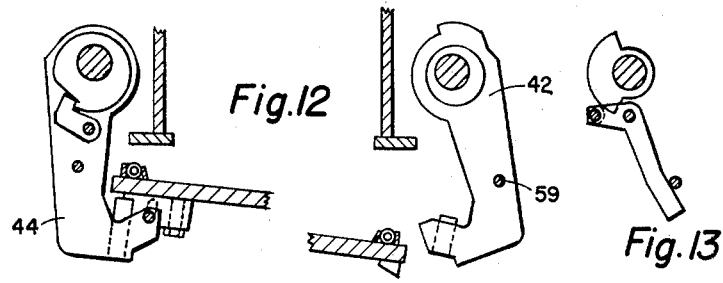
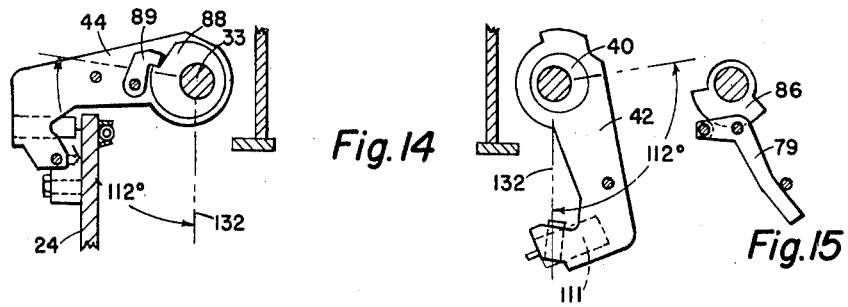

Aug. 18, 1964     E. L. ANDERSON     3,144,957
CLOSURE APPARATUS FOR PRESSURE CHAMBER
Filed Jan. 22, 1962                           5 Sheets-Sheet 4
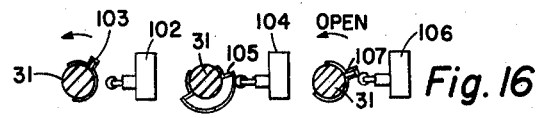
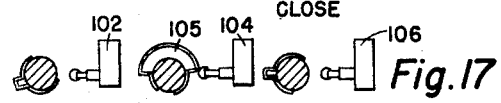
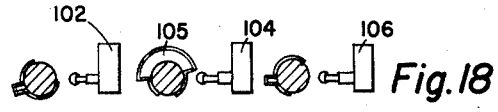
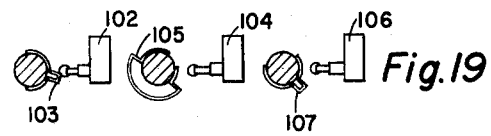
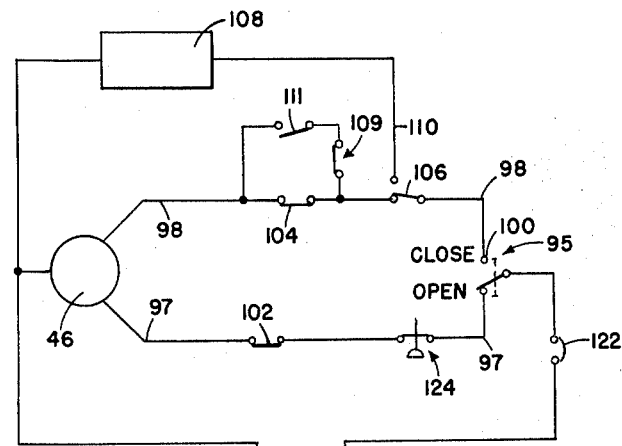
Fig. 20
INVENTOR.
EDGAR L. ANDERSON
BY
*Thomson & Roessel*
ATTORNEYS Aug. 18, 1964        E. L. ANDERSON                3,144,957
CLOSURE APPARATUS FOR PRESSURE CHAMBER
Filed Jan. 22, 1962                               5 Sheets-Sheet 5
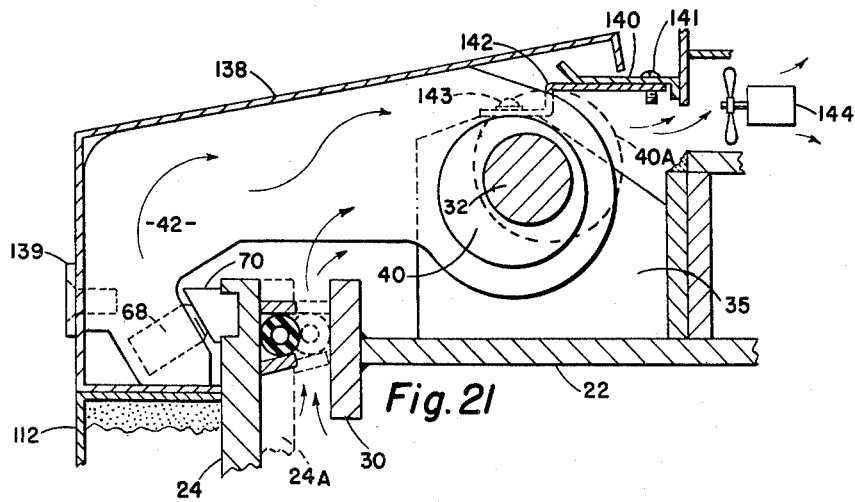
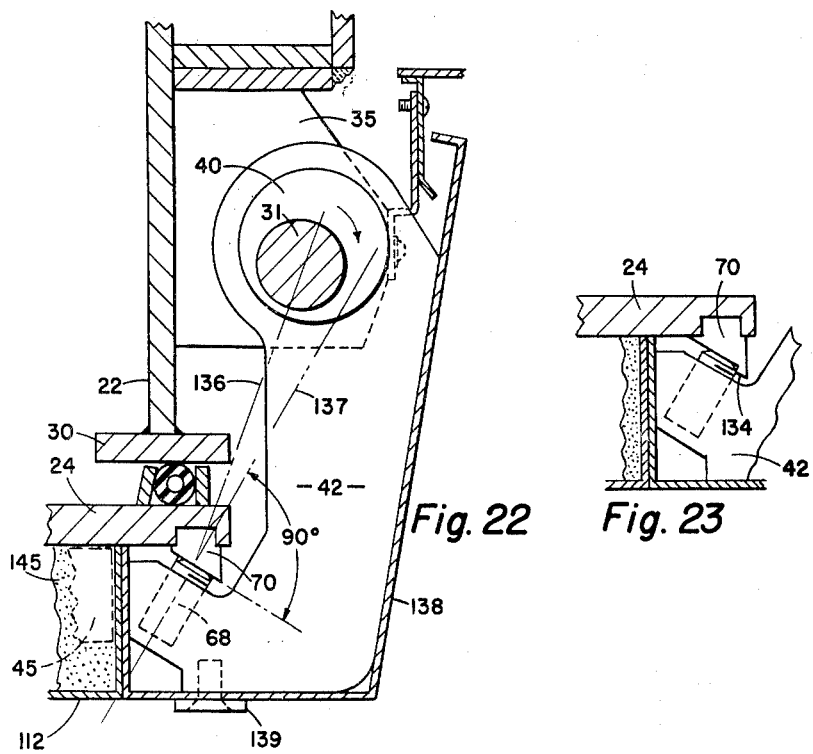
INVENTOR.
EDGAR L. ANDERSON
BY
*Thurson & Rossel*
ATTORNEYS though I have chosen to describe my invention as applied to controls for a sterilizer door, it will be understood that there are many features of my invention which have general applications to pressure chamber doors where automatic opening, closing, sealing, locking and otherwise securing of doors and other

United States Patent Office 3,144,957
Patented Aug. 18, 1964

3,144,957
CLOSURE APPARATUS FOR PRESSURE CHAMBER
Edgar L. Anderson, Penfield, N.Y., assignor to Wilmot Castle Company, Rochester, N.Y., a corporation of New York
Filed Jan. 22, 1962, Ser. No. 167,732
26 Claims. (Cl. 220—55.3)

This invention relates to apparatus closure and locking of doors for pressure chambers. This invention is particularly adapted for use with pressure chambers or sterilizers. For priority of filing date, reference is made to my copending application, Serial Number 139,674, filed September 21, 1961, disclosing but not claiming the invention claimed in this application.

In the past, doors adapted for use with sterilizers have been of the manual type. Manually operated sterilizer doors present certain inherent disadvantages in that the operator may, through inexperience and lack of understanding of operation of the sterilizing apparatus, open the door at the improper time. While certain safety features have been provided for manually operated doors as safeguards against this possibility, completely automatic operation of the door is far superior to manual operation.

Therefore, it is one object of my invention to provide control apparatus for a door adapted for automation.

It is a further object of my invention to provide a fully automatic door control apparatus. Most of the features of my invention are applicable not only for use with sterilizers but with pressure chamber doors generally.

One of the significant objects of my invention is the provision of improved apparatus responsive to pressure within the chamber for preventing either manual or automatic opening of the door unless the pressure within the chamber is at a selected level.

It is a further significant object of my invention to provide bearing surfaces for the locking elements intermediate the door and pressure chamber to prevent movement of the locking elements away from a locked position when a preselected level of pressure exists in the chamber.

It is another object of my invention to provide auxiliary pressure responsive means preventing the locking elements from moving away from an ajar position toward an unlocked position until a selected pressure level within the chamber has been reached.

It is highly desirable to provide means deflecting the steam pressure from the chamber away from the face of the door while the door is being moved from a locked to an ajar position. In the past, the possibility existed that the operator might incur steam burns if the sterilizer door was accidentally opened while there was steam pressure in the chamber. Therefore, it is an important object of my invention to provide apparatus between the door and sterilizer for venting steam while the door moves between locked and ajar positions.

Moreover, it is an object of my invention to provide apparatus preventing the door from moving from the ajar position to unlocked position until all pressure is vented from the chamber.

Although the need has always existed for deflecting radiant heat from sterilizers during the sterilizing cycle, air conditioning of hospitals has increased the need. Hence, one object of my invention is the provision of apparatus for exhausting the radiant heat around the periphery of the door during sterilization.

Oftentimes the last portion of the sterilizing cycle comprises an exhaust period leaving reduced pressure in the chamber. This presents the problem of possible explosive openings of the door when there is a slight vacuum in the chamber. Therefore, it is an additional object of my invention to provide apparatus retracting the hinge side of the door in advance of the non-hinged side of the door before the locking elements are moved from an ajar to an unlocked position thereby preventing any possibility of an explosive opening.

It is another important object of my invention to provide peripheral locking means coactive with the door when in the closed position to define a substantially continuous safety line visually indicating to the operator when the door is properly locked.

With the advent of my automatic sterilizer door, it is a further desirable object of my invention to provide integration of the sterilizing cycle with the automatic controls for the opening and closing, sealing and locking of the door, thereby automatically starting the sterilizing cycle only after the door has reached a closed and locked position.

It is a further object of my invention to provide simple relatively inexpensive apparatus to manufacture and maintain which is adapted for automation.

Other objects and advantages of this invention will be particularly set forth in the claims and will be apparent from the following description, when taken in connection with the accompanying drawings, in which:

FIGS. 4, 6, 8, 10, 12 and 14 are sectional views of the door and associated parts in various positions during opening taken along the line 4—4 of FIG. 1 looking in the direction indicated by the arrows with parts broken away;

FIGS. 5, 7, 9, 11, 13 and 15 are sectional views taken along the line 5—5 of FIG. 1 looking in the direction indicated by the arrows, illustrating various positions of parts of this embodiment corresponding respectively to the positions of the door appearing at the left of these figures and numerically preceding these figures by one numeral;

FIG. 16 illustrates positions of control cams of this embodiment corresponding to the position of other parts illustrated in FIGS. 4 and 5;

FIG. 17 illustrates positions of the control cams of FIG. 16 corresponding to the position of other parts illustrated in FIGS. 6 and 7;

FIG. 18 illustrates positions of the control cams of FIG. 16 corresponding to the position of other parts illustrated in FIGS. 8 and 9;

FIG. 19 illustrates positions of the control cams of FIG. 16 corresponding to the position of other parts illustrated in FIGS. 14 and 15;

FIG. 20 is a schematic drawing of the electrical circuitry of this embodiment of my invention;

FIG. 21 is an enlarged sectional view taken along the line 21—21 of FIG. 1 looking in the direction of the arrows;

FIG. 22 is an enlarged sectional view taken along the line 22—22 of FIG. 1 looking in the direction of the arrows; and FIG. 23 illustrates a second embodiment of the locking arrangement shown in FIG. 22.

While for purposes of illustration I have chosen to describe my invention as applied to controls for a sterilizer door, it will be understood that there are many features of my invention which have general applications to pressure chamber doors where automatic opening, closing, sealing, locking and otherwise securing of doors and other closure members are desired, particularly for pressure chambers generally.

It will be understood that the term "control means" as used in the claims will be construed to mean whatever apparatus is necessary to fulfill the claimed function.

First, I shall briefly describe the illustrated embodiment of my invention. For closure of the sterilizer opening, there is a door hinged at the left side to the body of a sterilizer by a plurality of spaced eccentrically controlled hook-hinges. My invention includes apparatus for yieldingly biasing the door toward closure of the opening and for controlling the yielding apparatus in a manner selectively moving the door between a door-open and substantially door-closed position.

Cooperating with these hook-hinges are a plurality of eccentrically controlled hook-locking means spaced around the periphery of the opening yieldingly biased toward an ajar position with the door when the door is in the ajar or substantially closed position.

Automatic controls rotate the hook-hinges and attached door arcuately to substantially the ajar or substantially closed position with respect to the sterilizer opening before the hook-locking means are rotated arcuately from an unlocked to an ajar position ready for locking the door to the sterilizer. Thereafter, the hook-hinges and hook-locking means are moved eccentrically in coordinated relation to a locked position in which the door is locked and sealed to the sterilizer.

Figure 1:
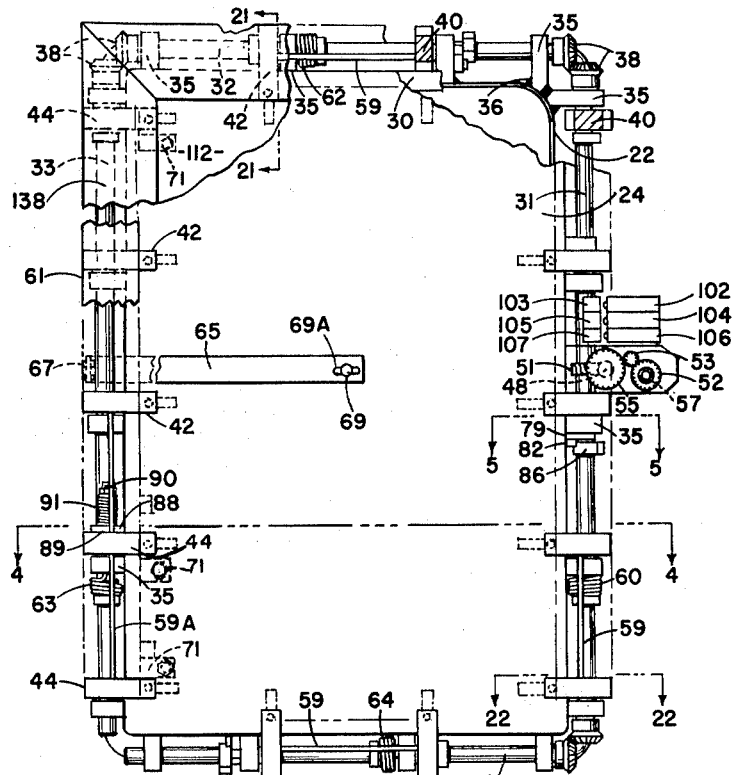
FIG. 1 is a front elevational view of one embodiment of my invention partly in section with parts broken away, illustrating the exterior face of the sterilizer door and adjacent apparatus controlling and locking the door.
Figure 2:
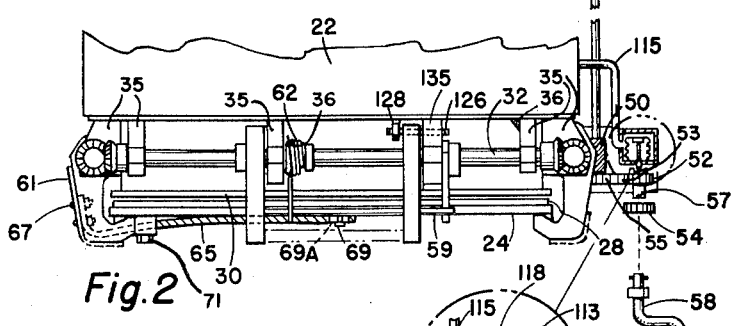
FIG. 2 is a top planar view of the embodiment illustrated in FIG. 1.

With reference to FIG. 1 and FIG. 2, I have illustrated a sterilizer or pressure vessel 22, referred to in the claims as a pressure vessel with which a door member 24 is adapted for closure. The door 24 is provided with a circular cross-sectional resilient seal 26 (FIG. 4) extending around the periphery of the door intermediate two peripheral flanges 28, of door 24, defining a groove. The seal is adapted for closure against a peripheral flange 30 of the sterilizer 22.

The apparatus automatically opening, closing, sealing and locking the door with respect to the sterilizer includes a plurality of rotatable shafts 31, 32, 33 and 34, completely encircling the door 24 and extending lengthwise along the edges thereof. These shafts are mounted in suitably spaced bearings 35 rigidly mounted around the perimeter of the sterilizer, as for example by welds 36. The adjacent ends of the shafts 31–34, except at the lower left hand corner of the sterilizer as viewed in FIG. 1, are provided with meshing bevel gears 38 rigidly carried thereon to provide a continuous driving relationship between the shafts. It will be understood that meshing bevel gears could be provided at all four corners of the sterilizer. However, such an arrangement would require greater precision of the gears and would present the inherent handicap of gears possibly not meshing properly.

Each of the shafts 31–34 carries a plurality of eccentric cams or locking control means 40 rigidly mounted thereon (FIG. 4). Each cam or locking control means 40 has either a hook member 42 or hinge member 44 journalled thereon. Hook members 42 are sometimes referred to in the claims in a broader sense as "Locking Means" to more broadly define the scope of my invention. A cam 40 upon which a hinge 44 is mounted is shown in broken lines in FIG. 6. Although hook and hinge members 42 and 44 are substantially identical in design, I have distinguished hinge members 44 from hook members 42 by nomenclature and numerical designation for purposes of this description because the hinge members have the dual function of pivotally carrying the door 24, as well as locking the hinged side of the door to the sterilizer 22 in substantially the same manner as hooks 42 lock the other three sides. Only the top and two bottom hooks on the left side of the door serve as hinge members 44; the remainder of the hooks on the hinge side of the door perform substantially the same function as hooks 42.

There is a plurality of blocks 45 (FIGS. 22 and 6) rigidly mounted around the periphery of door 24 aligned with each hook 42 for a purpose described below.

Automatic rotational movement of eccentric cams 40 is provided by a commercially available three wire reversible motor 46. Motor 46 drives a shaft 48 rigidly carrying a worm gear 50 meshing with and driving a helical gear 51 rigidly mounted on shaft 31.

The motor 46, being driven at a speed of approximately 60 r.p.m., drives shafts 31–34 at a speed of approximately 3 r.p.m. This speed reduction is accomplished through the worm gear 50 and meshing gear 51.

As illustrated in FIGS. 1 and 2, I have also provided manually controllable gears 52, 53 and 55, the latter of which is rigidly mounted on shaft 48 at the end opposite motor 46. Gear 53 is merely an intermediate idler gear. Gear 52 is provided with a slot 57 adapted for receiving a manually controllable crank 58 in driving relationship.

Rods 59 interconnect all hooks 42 along each of the shafts 31, 32 and 34. However, for simplicity and clarity of the drawings, I have not shown rods 59 as interconnecting all hooks along the shaft 31.

At 59A, I have provided a rod interconnecting the two hooks 42 and the hinges 44 carried by shaft 33. Again, for purposes of simplifying the drawings, rod 59A is only shown between the bottom hinge and hook. A rigid plate 61 interconnects only the hinges 44 carried by shaft 33.

Plate 61 furnishes rigid support for a yielding spring member 65 rigidly connected at its left end to plate 61 by bolts 67. Spring 65 is slidably mounted at its right end on a bolt 69 attached to door 24. Bolt 69 traverses a slot 69A in spring 65. Spring 65 cooperative with a sliding hinge arrangement between the hinge members 44 and door as described in detail below biases the right hand side of the door toward closure and the left hand side of the door open, thereby providing a dual purpose. First, when the door is being opened or closed, the spring 65 assures that the right hand side of the door is in closed relation with the sterilizer opening before arcuate movement of hooks 42 selectively between the ajar and unlocked positions or vice versa. Secondly, when the door is being opened, the left side is insured of being opened, in case of reduced pressure in the sterilizer or sticking of the seal, before the hooks 42 are moved arcuately from ajar to unlocked positions, thereby preventing an exposive opening of the door 24 after the hooks 42 are free of the door. It will be understood that a door cover 112 and deflectors 138 covering the hooks and hinges (see FIG. 21) will not interfere with this function.

Hooks 42 have threaded bores 66 (FIG. 4) receiving adjustable threaded screws 68 adapted to frictionally bear on the outwardly or exteriorly disposed inclined faces 129 of locking pads 70 rigidly welded to door 24. It will be understood that, in lieu of pads 70, shouldered portions could be provided on the door to be engaged by hooks 42 in locking relationship. Blocks 45 and pads 70 (FIG. 6) define notches for receiving hooks 42 in wedged relationship.

The left hand side of the door is provided with three hinge blocks 71 (FIG. 4) rigidly mounted thereto, for example by bolts 72. Each block 71 has an elongated slot 73 extended normal to the door 24 for receiving a pin 75 rigidly mounted to each hinge member 44. Pin 75 is slidable within slot 73 and provides a secondary hinge cooperating with spring 65 to permit the left hand side of the door to be opened before the right hand side of the door is opened. Adjustable screw members 77 are received internally of threaded bores 78, provided in hinge members 44, it being understood that screw members 77 are adjusted as illustrated in FIG. 4 to abut door 24 when in the locked position.

Torsion springs 60, 62, 63 and 64, rigidly mounted respectively to shafts 31–34 inclusive, are provided to bear against rods 59 and 59A thereby biasing hooks 42 and hinge members 44 from open toward the ajar position, as illustrated in FIGS. 1, 2 and 4. In FIG. 4 I have shown torsion springs 60 and 63 in broken line. This particular arrangement of springs provides a very important safety feature to be explained hereinafter. I shall now, for simplification of the description, describe, with reference only to the right side of the door, as viewed in FIG. 1, the automatically actuated control mechanism, by which all of the hooks 42 around the non-hinge sides of the door are controlled in opposition to the torsion springs 60, 62, and 64.

In FIG. 5, I have illustrated the automatically actuated control mechanism for maintaining these hooks in what shall, for purposes of this application, be referred to as a normal position during the opening and closing of the door. The rod 59, against which torsion spring 60 bears, as illustrated in FIG. 4, is shown again in section at FIG. 5. Selectively opposing the biasing action of spring 60 is an angular lever 79 pivotally mounted on one of the bearings 35 (FIG. 1). For maintaining the hooks in their normal position, lever 79 carries a follower roller 82 pivotally mounted on a depending pin 84. The action of lever 79 is controlled by a cam 86 rigidly mounted on shaft 31 engaging follower rollers 82.

From the above described portions of this embodiment, it will be understood that the combination of the lever 79 permitting the spring 60 to close the hooks 42 and the hooks being journalled onto cams 40 provides automatically actuated hooks which will yield to force, sufficient to overcome the bias effect of torsion spring 60. Thus, no self-inflicted damage of the apparatus can result from interfering parts and no bodily injury can be occasioned by human limbs accidentally getting between the hooks and other parts. This same apparatus is provided for controlling hooks carried by shafts 32 and 34.

Lever 79 may be resilient, so long as it provides sufficient force to overcome the force of torsion spring 60. In this manner, the hooks are rendered yieldable in either direction of rotation on shafts 31–34.

There are numerous ways in which the yielding hook arrangement could be provided such as a detent between the cam and the hook or in the manner in which the hinges 44 and hooks 42 of the hinged side of the door are actuated, as described below. All such possibilities are within the scope of my invention.

The automatically actuated control mechanism for hinges 44 and hooks 42, of the left or hinged side of the door, comprises a catch member 88 rigidly mounted to rotate with shaft 33 and a latch 89 pivotally mounted to a pin 90 carried by member 44. A torsion spring 91 (FIG. 1) is rigidly attached at one end of pin 90 and at its other end to latch 89 tending to maintain the latch in an engaged position with rotatable catch member 88. Thus, as the catch member 88 is rotated clockwise, as viewed in FIG. 10, by shaft 33, an indenture or notch 92 of catch 88 receives a mating portion of latch 89 in proper timed relationship with the other automatically controlled portions of my invention, for pivoting the hinges 44 and hooks 42, on the hinged side of the door in opposition to spring 63 to the ultimate "open" position illustrated in FIG. 14.

From the above description, it is clear that during the closing cycle hinges 44 and hooks 42 on the hinged side of the door yieldingly move the door 24 arcuately from the position shown in FIG. 14 to the position shown in FIG. 10. Thereafter, the hooks 42 surrounding the other three sides of the door are moved arcuately from the position in FIG. 10 to the position of FIG. 8. Then the eccentric cams 40 move all hinges 44 and hooks 42 radially with respect to the shafts 31–34 from the position in FIG. 8 to that of FIG. 4, thereby bringing the door 24 into secure locking relationship with the sterilizer 22.

With reference to FIG. 20, I shall now describe the electrical circuitry by which automation is accomplished. Terminal connections 93 of the circuit are across a 115 volt alternating current line. At 46, I have illustrated the motor across the line. A manually controlled switch 95 selectively completes a circuit through a line 97 to the motor 46 for opening the door and through a line 98 to the motor for closing the door. I have illustrated control switch 95 in the "open" position completing the circuit through line 97 to the motor.

When switch 95 is manually actuated to make contact with line 98, the circuit is completed to drive the motor in the direction closing the sterilizer door 24 if certain control switches described below complete the circuit.

Three cam-controlled-normally-closed switches 102, 104 and 106 control automation of the door. These switches are schematically illustrated in FIGS. 16–19 inclusive. Cams 103, 105 and 107 for controlling these switches are shown in various positions in these same figures. Switches 102, 104 and 106 are mounted on sterilizer 22 as illustrated in FIG. 1. Cams 103, 105, and 107, respectively controlling switches 102, 104, and 106, are rigidly mounted on shaft 31 in the manner illustrated in FIGS. 1 and 16–19 Shaft 31 rotates these cams in a counter-clockwise direction when the motor is being operated across line 97 to open the door and in a clockwise direction when motor is across line 98 to close the door as designated by the arrows of FIG. 16 at cam 107. Switch 102, in circuit with line 97, is actuated by cam 103, as illustrated in FIG. 19, at the end of the opening cycle for stopping the door at the position of FIG. 14.

At 108, I have illustrated the automatic controls for the sterilizing cycle. Before switch 95 is manually changed to the "close" cycle, the operator simply pushes buttons (not shown) associated with controls 108 and sets a timer for the desired period of sterilization. When the motor is in circuit with the line 98, normally closed switch 106 is actuated at the end of the "close" cycle to break the circuit through line 98 and make the circuit to the sterilizer controls 108 through a line 110. Thus, the sterilizing cycle, controlled by the circuitry at 108, commences upon closure and locking of the door. In turn, the motor 46 is stopped and shaft 31 thereby maintains cam 107 in a position holding switch 106 in circuit with line 110 throughout the entire sterilizing cycle.

The circuitry includes a normally-open switch 111, in parallel circuitry with switch 104 mounted on one of the hooks 42 of shaft 31, as illustrated in FIG. 8. Switcth 111 closes to complete the circuit to motor 46 only when contact is made with a door cover 112 detachably mounted to the plurality of blocks 45. Also, I have provided a manually controlled normally closed switch 109 in series with switch 111 for a purpose to be described hereinafter.

Assuming that the hooks and hinges are maintained in their "normal" position without inteference, the cam 105 is positioned on shaft 31 in a manner permitting normally-closed switch 104 to remain closed until normally open switch 111 has been closed by engagement with the door cover 112. FIG. 8 shows the position of switch 111 making contact with door cover 112 momentarily before cam 105 reaches the position shown in FIG. 17 for opening switch 104.

One of the safety features of my invention, to be described hereinafter, is accomplished by cam 105 opening switch 104 to stop the motor 46 when inteference occurs preventing switch 111 from engaging door cover 112 before cam 105 opens switch 104.

Figure 3:
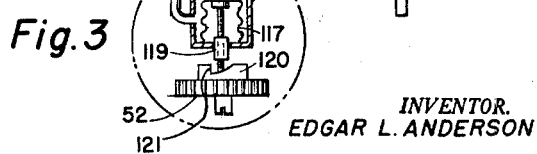
FIG. 3 is an enlarged view of the encircled portion of FIG. 2.

I shall now describe the various safety features of my invention. With reference to FIGS. 2 and 3, I have provided an enclosed chamber 113 exposed through a conduit 115 to the sterilizer chamber. A bellows 117, mounted inside of chamber 113 responsive to the steam pressure of the sterilizer, controls a pin or stop member 118 slidably mounted in a bushing 119. Pin 118 in combination with catch 120 rigidly mounted to rotate with gear 52 furnishes a ratchet device preventing shaft 48 from turning when there is a selected pressure level in the sterilizer.

If switch 95 be actuated to the "open" position shown in FIG. 20 when the pressure in the sterilizer chamber is above the selected level, friction will stall the motor and thereby actuate a circuit breaker 122 (FIG. 20) and open the circuit to the motor 46. This apparatus will also prevent anyone from manually opening the door by the use of the crank 58 (FIG. 2).

As an additional safety feature, I have provided a pressure switch 124 (FIG. 20) exposed to the pressure in the sterilizer chamber in circuit with line 97 preventing the motor 46 from operating if the chamber is above preselected pressure level.

Another safety feature of this invention is the friction transmitted between the largest radial portion of eccentric cam 40 and hook 42, in the locked position shown in FIG. 4, when the sterilizer chamber is at elevated pressures. This friction is sufficient to stall motor 46 and actuate circuit breaker 122 to open the circuit if any attempts are made to open the door while a selected pressure level exists in the chamber.

A further safety feature of my invention is the combination of the inwardly or interiorly disposed inclined surface 127 (FIG. 4) provided by the adjustable screws 68 of hooks 42 and the mating outwardly or exteriorly disposed inclined surface 129 of the locking pads 70 against which screws 68 bear in the locked position. With reference to FIG. 22, an imaginary line 136 extends from the center of the bearing surface of screw 68 and pad 70 through the center axis of shaft 31 and the largest radius of the eccentric cam 40 when disposed on the opposite side of shaft 31 from screw 68, thereby providing maximum locking force between the locking elements 68 and 70. It will be observed that the central axis 137 of screw 68, which is normal to the inclined bearing surfaces 127 and 129 is beyond the center axis of shaft 31. This is to insure that the hooks 42 cannot be moved arcuately away from the locked position without first being moved to the ajar position and to increase the wedging action between the inwardly disposed inclined surfaces 127 of the hooks 42, against the outwardly disposed surfaces 129 of pads 70 and outward normal surfaces 145 (FIG. 4) of hook 42 against inward normal surfaces 146 (FIG. 6) of block 45. The locked position is again illustrated in broken lines in FIG. 21 where respective parts are designated by the same numeral followed with the suffix "A." If there is not sufficient pressure in the sterilizer chamber to prevent the previously described safety devices from preventing the hooks 42 from moving to the ajar position, then any pressure in the sterilizer 22, sufficient to overcome the force of spring 65 (FIG. 1), will maintain the pad 70 in an engaged position with screw 68, as viewed in solid lines in FIG. 21. The selected angle of the bearing surfaces of these locking elements 68 and 70, described above with relation to line 137, increases the security of the screws against the pads 70. This arrangement prevents the locking hooks 42 from rotating away from the door until the sterilizer 22 is vented of all pressure. Once the sterilizer 22 is vented, the force of spring 65 will be sufficient to bias the right side of the door toward closure and lever 79 will rotate the hooks free of the inclined pads 70.

In FIG. 23, a preferred embodiment of the inclined pad 70 is shown, with an abutment 134. Abutment 134 cooperates to insure that the hooks will not be rotated free of the door until all pressure is vented from the sterilizer 22.

A very important feature of this invention is the deflection of any steam pressure away from the operator while the door is moved from the locked to the ajar position and also while in the ajar position. As best illustrated in FIG. 21, a plurality of deflectors 138 extending the full length of each side of the sterilizer door 24 (see also FIG. 1) are rigidly mounted to the hooks by screws 139. As will be understood from the drawings, these deflectors define an enclosed channel surrounding the periphery of the door. Because of the angular movement of hooks 42 it is necessary to furnish a plurality of secondary deflectors 140 intermediate the hooks 42 and deflectors 138. Secondary deflectors 140 are mounted at 141 to supports 142 in turn fastened at 143 to bearings 35.

It will be understood that these deflectors direct any steam away from where the operator would be standing. A fan 144 may be provided to facilitate venting of steam or air pressure.

The deflectors in combination with the fan have a supplementary and important feature. During sterilization, the fan withdraws radiant heat from around the periphery of the door. The problem of radiant heat from sterilizers is becoming an increasingly important problem because of air conditioning in hospitals. The door cover 112 is provided with substantial insulation 145 (FIG. 22).

An additional safety factor of the deflectors 138 is the fact that they are designed to mate with the entire periphery of door cover 112 when all hooks are in locked position (FIG. 1). Therefore, the operator can see at a glance whether all of the hooks are closed and locked.

Perhaps the most important safety feature of my invention is to prevent the possibility of personal injury to the operator as the result of limbs accidentally getting between the hooks and the door or damage from an object being placed intermediate the hooks 42 and the door 24. I have provided two safety devices to this end for stopping movement of the drive shafts 31–34 if the interfering human limb or object is not withdrawn before the drive shafts and cams reach a selected position. This position is reached before any possible injury or self-inflicted damage can occur.

The basis of both safety devices depends upon the resilient mounting of the hooks 42 with relationship to the driving shafts 31–34 inclusive, whereby a hand or other object inserted intermediate the hooks and the door will force the hooks out of the normal position, in which they are yieldably maintained by torsion springs 60.

The first of these two safety devices includes a pin 126 (FIGS. 2 and 6) rigidly mounted at one end to one of the bearings 35 and at the other end in a support 128, in turn rigidly connected to the sterilizer 22 as illustrated in FIG. 2. At least one hook 42 on each non-hinged side has a cam projection 130 adapted to engage pin 126 when a hook 42 is actuated out of its normal position by some interfering object. It will be understood that, because of the interconnection of the hooks 42 by pins 59, it is only necessary to provide one pin 126 for each side of the door and a corresponding projection 130 on only one of the hooks 42.

It will be understood that the projection 130 is designed in contour such that it does not engage pin 126 so long as the hooks 42 are in their normal position during the opening or closing cycle.

In FIG. 6 I have shown, in solid lines, the hook 42 at its normal position when the other parts of the apparatus are at the illustrated position. In broken line at 42A, I have illustrated the hook at a position to which it might be forced by an interfering object. Thus, it will be noted that the projection 130 is brought in line with pin 126. If the hand or other article creating the interference is not removed from the interfering position, the eccentric cam 40, rotating in a clockwise direction for closure, will move the projection 130 into engagement with pin 126. Thereafter, the wedging action of the largest radial portion of the eccentric cam 40 forcing projection 130 into increasing frictional engagement with pin 126 creates sufficient friction between cam 40 and hook 42 to stall the motor 46 and actuate the circuit breaker 122 to deactuate the motor 46, thereby stopping the drive shafts 31–34. If the apparatus is being operated by manual control, the operator will be prevented from turning the crank 58 (FIG. 1) any further in a closure rotational direction.

The second safety device includes electrical circuitry and therefore is only effective during automatic operation. This safety device comprises normally closed switch 104 and normally open switch 111 carried by a hook 42. At the commencement of the closing cycle when the switch 95 makes contact with line 98, the illustrated parts are in the positions respectively illustrated in FIGS 14, 15 and 19. At the commencement of the closing cycle, switch 104 is in its normally closed position completing the circuit through line 98 and switch 111 is in its normally open position. The switches remain in these positions until the cam 105 reaches the position illustrated in FIG. 18 and the hooks 42 and switch 111 arrive at the corresponding position illustrated in FIG. 8. In this position switch 111 has engaged the door cover 112 thereby closing the normally open switch 111 before cam 105 has opened switch 104. Instantaneously thereafter, switch 104 is opened by the cam 105 as seen from FIG. 17. Hence, if interference prevents switch 111 from engaging door cover 112 before cam 105 reaches the position shown in FIG. 17, the motor 46 and shafts 31–34 stop.

A very important mechanical safety feature was provided for the opening cycle to prevent damage to the apparatus as a result of some object coming into an interfering position with the exterior face of either door 24 or door cover 112 opposing opening thereof. This end has been accomplished by providing a detent between the hinges 44 and catch member 88 controlling the movement of the hinges. This detent comprises latch 89 and notch 92 of catch 88, as indicated in FIG. 10 at 131, and the torsion spring 91. When force opposing opening of the door occurs, inclined surfaces at 131 permit the latch 89 to release the rotatable catch member 88 in opposition to torsion spring 91 (FIG. 1). The catch 88 continues to rotate with the shaft 33 free of any driving connection with the hinge member 44.

I shall now describe in detail the operation of my invention in light of the above description. I shall describe the opening cycle commencing with the extreme closed position of FIGS. 4 and 5 and terminating with the extreme open position at FIGS. 14 and 15, with all intermediary numbered drawings representing selected positions of the mechanical structure between open and closed positions.

In the extreme closed position illustrated in FIG. 4, the largest radius of eccentric cam 40 extends at an angle in the first quadrant of approximately 18° with a plane 132 which is normal to the door 24. At this position, maximum locking force is transmitted through adjustable screw 68 to the pad 70. The operator throws switch 95 to the position shown in FIG. 20 completing the circuit through line 97 to the motor 46. As shown in FIGS. 16 and 20, switch 102 is in its normally closed position with cam 103 being rotated, in a counter-clockwise direction, away from switch 102. The cams 40 move the hooks 42 and hinges 44 from a locked position of FIG. 4 to an ajar position of FIG. 8, where the largest radius of eccentric cam 40 extends at an angle in the second quadrant of approximately 33° with the plane 132.

It will be noted from FIGS. 6 and 8 that, as the hinge 44 is moved from the position illustrated in FIG. 4 to that illustrated in FIGS. 6 and 8, the pin 75 carried by hinge member 44 slides backwardly in the slot 73 of block 71 so that the door 24 is free to pivot slightly in response to spring 65 for retracting the left side of the door in advance of the right side of the door for the purposes above described.

As illustrated in FIG. 9, the follower roller 84 has started up the raised portion of cam 86. The raised portion of this cam turns lever 79 in a counter-clockwise direction, about pivot rod 80, to the position shown in FIG. 11, thereby pivoting the hooks 42, interconnected by rod 59, to an unlocked position illustrated in FIG. 10 where the largest radius of the eccentric cam 40 extends at an angle of approximately 12° with plane 132 in the fourth quadrant. When the hooks are in this unlocked position the door is free to be pivoted on hinges 44 to an open position. Throughout the remainder of the opening cycle, cam 86 maintains hooks 42 in this unlocked position.

When the hinge members 44 have reached the position illustrated in FIG. 10, the notch 92 of catch member 88, being rotated in a clockwise direction, picks up the latch 89 and rotates the hinge member 44 in a clockwise direction successively to the positions of FIGS. 12 and 14.

When the described parts have reached the position illustrated in FIGS. 14 and 15, the cam 103 has reached the position of FIG. 19 for engaging and opening normally closed switch 102 and breaking the circuit to motor 46 to stop the door.

I shall now describe the operation of the apparatus and circuitry during the closing cycle. Switch 95 is manually changed so that switch 95 completes the circuit through line 98 to the motor 46. Switches 104 and 106 are in their normally closed positions illustrated in FIG. 20 supplying current through line 98 to the motor 46 and switch 111 is in its normally open position.

In the extreme open position illustrated in FIG. 14, the largest radius of eccentric cams 40 is angularly displaced from plane 132 by an angle of 112°. Closure of the door 24 follows the same sequence of drawings described above for the opening cycle but in reverse order commencing with FIG. 14 through and including FIG. 4 and FIG. 19 back to FIG. 16.

Commencing with FIG. 14, the hooks 42 are maintained in the retracted unlocked position by the lever 79 while the catch member 88, now rotating in a counter-clockwise direction, permits the torsion spring 63 (FIG. 4) to swing the hinge members 44 and door 24 in a counter-clockwise direction to the ajar position of FIG. 10. Thus, the door is permitted to close before the hooks 42 of the non-hinged sides of the door move to the ajar position.

It will be noted from FIG. 11 that the follower roller 82 of lever 79 is just ready to drop from the raised portion of cam 86 to its position in FIG. 9, at which position the torsion spring 60 (FIG. 4) biases the hooks 42 in a clockwise direction to the ajar position of FIG. 8.

When the hook 42 has arrived at the position shown in FIG. 8, switch 111 has engaged door cover 112, to close normally open switch 111, at a time when cam 105 is in the position of FIG. 18. Thereafter, cam 105 is rotated clockwise to the position of FIG. 17 corresponding to FIGS. 6 and 7 where cam 105 opens switch 104.

Thus, if no interference has occurred, the circuit to the motor 46 through line 98 continues to operate the motor during closure. If interference has occurred intermediate the hooks 42 and the door 24, normally open switch 111 does not close and the switch 104 breaks the circuit to the motor.

Assuming no interference, the eccentric cams 40 will move the hooks 42 and hinges 44 from ajar positions of FIG. 8 to locked position of FIG. 4, where sealing and locking force is applied through the adjustable screws 68 to the pads 70 on all sides and through the adjustable screw 77 of the hinge members 44 to the door. When the motor has carried the shafts 31–34 inclusive to this position, the cam 107 engages a switch 106, as illustrated in FIG. 16, to break the circuit to the motor and close the circuit through line 110 to the electrical controls 108 for the sterilizing cycle and sterilization commences.

With the speed of the shafts 31–34 inclusive being 3 r.p.m., it takes approximately 16 seconds to fully open or close and seal the door.

The manually controlled normally closed switch 109 in combination with the cam controls for normally closed switch 104 provide means for stopping the apparatus at the ajar position. In the sterilizer trade, it is desirable to provide a door which may be left ajar when not in use. It will be understood from the above description that if the operator manually opens switch 109, cam 105 will open switch 104 and stop all moving parts in the ajar position of FIGS. 6 and 7.

Obviously, means for slidably supporting the door with relationship to the sterilizer could be provided in combination with locking hooks 42 surrounding the entire periphery of the door in lieu of hinges 44.

While I have shown and described the preferred form of mechanism of my invention it is apparent from the last paragraph that various modifications and changes may be made therein, particularly in the form and relation of parts, without departing from the spirit of my invention as set forth in the appended claims.

I claim:

1. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: locking means intermediate said members automatically movable between locked, ajar and unlocked positions for locking and sealing said members together when in said locked position, and safety control means between said members permitting said locking means to move from said ajar position to said unlocked position only if pressure in said chamber has been reduced to a preselected level.

2. Apparatus in accordance with claim 1 in which said door member is hinged to said vessel member at a first side of said opening.

3. Apparatus in accordance with claim 2 including yielding means intermediate said members biasing said door member toward closure with said vessel member thereby to free said door to move from ajar to unlocked positions, said yielding means being overcome by the outward pressure on said door greater than said preselected level.

4. Apparatus in accordance with claim 1 including deflector means intermediate said members venting any fluid pressure differential between atmospheric pressure and chamber pressure at the periphery of said door away from front of and the periphery of said door while said locking means is between said locked and substantially ajar positions.

5. Apparatus in accordance with claim 1 including second safety control means permitting said locking means to move from said locked to said ajar position only after pressure in said chamber has reached a preselected level.

6. Apparatus in accordance with claim 1 in which said locking means includes hook means rotatably mounted on one of said members at a first side of said door member when in substantially the ajar position for rotation about an axis extending substantially parallel to said first side of the door member and mating pressure pad means mounted on the other of said members, means moving said hook means from said locked position to said ajar position in a direction substantially normal to said door member whereby internal pressure in said chamber maintains said hook and pad means in locking relationship and means moving said hook means from said ajar position to said unlocked position in a direction substantially arcuately away from said pad means.

7. Apparatus in accordance with claim 6 in which said safety control means comprises interlocking surfaces intermediate said hook and pressure pad means maintaining locked relationship therebetween responsive to outward pressure on said door member.

8. Apparatus in accordance with claim 6 in which said safety control means comprises an inwardly disposed inclined surface on said hook means and a mating outwardly disposed inclined surface on said pressure pad, said surfaces increasingly bearing on each other in response to increased outward pressure on said door member.

9. Apparatus in accordance with claim 6 including means coactive with said pad means to define a wedge means for receiving said hook means.

10. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: locking means intermediate said members movable between locked and unlocked positions for locking and sealing said members together when in said locked position, an electric motor automatically driving said locking means, a circuit breaker means in circuit with said motor, said circuit breaker being preset to open said circuit when sufficient friction is transmitted through said locking means, responsive to a preselected pressure level in said chamber, to stall said motor, thereby permitting said locking means to move from said locked position to said unlocked position only if pressure in said chamber has been reduced to a preselected level.

11. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising, locking means intermediate said members having locked and unlocked positions for locking and sealing said members together when in said locked position, an electric motor driving said locking means, a circuit breaker in circuit with said motor and being preset to open said circuit when sufficient friction is transmitted through said locking means, responsive to a preselected pressure level in said chamber, to stall said motor.

12. Improved apparatus in combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: a shaft rotatably mounted on a first of said members at a first side of said door member extending along said first side of the door when in a substantially locked position, locking means rotatably mounted on and coactive with said shaft and being adapted for locking said members together, means between said members at a second side of said door member coactive with said locking means for locking said door, control means for controlling the rotation of said shaft relative to said locking means for moving said locking means between locked and unlocked positions, means responsive to sufficient friction transmitted between said locking means and shaft which is created when the pressure in said chamber is above a preselected level for preventing said locking means from moving from the locked to the unlocked position.

13. Apparatus in accordance with claim 12 including an eccentric cam rigidly carried by said shaft, said locking means being rotatably carried on said cam.

14. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: means intermediate said members for automatically opening said door from a locked position to an ajar position and means responsive to the internal pressure of said chamber for automatically opening said door from said ajar position to an open position only after the internal pressure of said chamber has been reduced to a preselected level.

15. Apparatus in accordance with claim 14 including deflector means intermediate said members venting any fluid pressure differential between atmospheric pressure and chamber pressure at the periphery of said door away from the front of and the periphery of said door while said locking means is between said locked and substantially ajar positions.

16. Improved apparatus in combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: locking means intermediate said members having locked, ajar and unlocked positions for locking and sealing said members together when in said locked position and means moving said door from said locked position with sufficient force to overcome a selected level of reduced fluid pressure in said chamber to open said door member before said locking means are moved from ajar to unlocked positions.

17. Apparatus in accordance with claim 16 in which a first side of said door is slidably hinged to the door support member and in which said biasing means biases only said hinged side of the door open.

18. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: locking means intermediate said members having locked, ajar and unlocked positions for locking and sealing said members together when in said locked position and deflector means intermediate said members venting fluid pressure differential between atmosphere and chamber away from the front of and periphery of said door while said locking means is between said locked and said ajar positions.

19. Apparatus in accordance with claim 18 in which said deflector means are movable with said locking means.

20. Apparatus in accordance with claim 18 in which said locking means carry deflector means coactive with said door member when in the ajar position to define a channel extending around the opening formed between said members when in the ajar position.

21. Apparatus in accordance with claim 18 including exhaust means coactive with said deflector means for facilitating the venting of fluid pressure differential.

22. Apparatus in accordance with claim 18 in which said locking means comprises hook means rotatably carried on one of said members and means intermediate said hook means and one of said members for moving said door member selectively between said locked and ajar positions and in which said deflector means is carried by said hook means to define a substantially enclosed channel surrounding the periphery of said door member.

23. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: deflector means intermediate said members defining a substantially enclosed channel surrounding the periphery of said door member, and exhaust means removing fluids from said channel to cool the periphery of said door.

24. Improved apparatus for combination with a sterilizer vessel member having a pressure chamber with an opening, a door member adapted for closure of said opening, support means supporting said door exteriorly of said chamber for movement between open and closed positions, sealing means intermediate said members adapted to surround the periphery of said opening, said improvement comprising: means for opening said door from a locked position to an ajar position in which the door is in a substantially parallel position with said opening and deflector means intermediate said members defining a substantially enclosed channel surrounding the periphery of said door for venting any fluid pressure differential between atmospheric pressure and chamber pressure at the periphery of said door away from the front of and periphery of said door while said door is between said locked and substantially ajar positions.

25. Apparatus in accordance with claim 24 including means for releasing said door from said ajar position after the pressure in said chamber drops below said preselected level and for pivoting said door to an open position.

26. Improved apparatus for combination with a pressure vessel member having an opening, a door member adapted for closure of said opening, support means supporting said door exteriorly of said chamber for movement between open and closed positions, sealing means intermediate said members adapted to surround the periphery of said opening, said improvement comprising: locking means intermediate said members for locking and sealing said members together when in a locked position, said locking means peripherally surrounding said door thereby defining a substantially continuous safety line when in said locked position, said safety line visually indicating to the operator when the door is properly locked.

References Cited in the file of this patent

UNITED STATES PATENTS

| | | |
|---|---|---|
| 1,960,890 | Bidwell | May 29, 1934 |
| 2,112,639 | Underwood | Mar. 29, 1938 |
| 2,470,776 | Jewell | May 24, 1949 |
| 2,538,661 | Vischer | Jan. 16, 1951 |
| 2,841,308 | Weicker | July 1, 1958 |
| 2,966,999 | Swanson | Jan. 3, 1961 |